(12) United States Patent
Chen et al.

(10) Patent No.: US 10,082,174 B2
(45) Date of Patent: Sep. 25, 2018

(54) MOVEMENT GUIDE DEVICE

(71) Applicants: THK CO., LTD., Tokyo (JP); Yu Chen, Liaoning (CN)

(72) Inventors: Yu Chen, Liaoning (CN); Meile Wang, Liaoning (CN); Kentaro Hikomoto, Liaoning (CN); Guangming Guo, Liaoning (CN)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/551,114

(22) PCT Filed: Jan. 15, 2016

(86) PCT No.: PCT/CN2016/071040
§ 371 (c)(1),
(2) Date: Aug. 15, 2017

(87) PCT Pub. No.: WO2016/131356
PCT Pub. Date: Aug. 25, 2016

(65) Prior Publication Data
US 2018/0031036 A1 Feb. 1, 2018

(30) Foreign Application Priority Data
Feb. 16, 2015 (CN) .......................... 2015 1 0084770

(51) Int. Cl.
*F16C 29/06* (2006.01)
*F16C 29/04* (2006.01)
*F16C 33/34* (2006.01)

(52) U.S. Cl.
CPC .............. *F16C 29/04* (2013.01); *F16C 33/34* (2013.01)

(58) Field of Classification Search
CPC .. F16C 29/06; F16C 29/0604; F16C 29/0607; F16C 29/0642; F16C 29/0645; F16C 29/0647
See application file for complete search history.

(56) References Cited

U.S. PATENT DOCUMENTS 4,715,729 A * 12/1987 Tanaka ................ F16C 29/0607
384/44
4,932,067 A * 6/1990 Pester ................. F16C 29/0607
384/45

(Continued)

FOREIGN PATENT DOCUMENTS

| CN | 1196780 A | 10/1998 |
| CN | 1199451 A | 11/1998 |

(Continued)

OTHER PUBLICATIONS

International Search Report dated Apr. 20, 2016, issued in Counterpart of International Application No. PCT/CN2016/071040 (2 pages).

(Continued)

*Primary Examiner* — Phillip A Johnson
(74) *Attorney, Agent, or Firm* — Westerman, Hattori, Daniels & Adrian, LLP

(57) ABSTRACT

A movement guide device comprises: a support body formed with two roller rolling grooves in each of two side surfaces thereof; a moving body assembled onto the support body to freely move along the support body, and having a load roller rolling groove provided opposite to the roller rolling groove to form a load path together with the roller rolling groove; rollers arranged such that lines forming a contact angle with respect to the roller rolling groove intersect at a position outside the support body; and a roller retaining member arranged between two row of rollers, the moving body comprises a main moving body and cover bodies mounted at (Continued)

two ends of the main moving body; in the movement guide device, the roller retaining member comprises a roller retaining portion, formed in a plate shape extending in a length direction of the support body, and orthogonal to the length direction.

3 Claims, 7 Drawing Sheets

(56) References Cited

U.S. PATENT DOCUMENTS

| | | | |
|---|---|---|---|
| 5,584,581 A * | 12/1996 | Keller | F16C 29/0607 384/13 |
| 5,947,605 A | 9/1999 | Shirai | |
| 6,045,265 A | 4/2000 | Shirai et al. | |
| 2005/0018933 A1 | 1/2005 | Ishihara | |
| 2015/0093055 A1 | 4/2015 | Ikegami et al. | |

FOREIGN PATENT DOCUMENTS

| | | | |
|---|---|---|---|
| CN | 203979141 U | 12/2014 | |
| CN | 104271972 A | 1/2015 | |
| EP | 0802337 A2 * | 10/1997 | ......... F16C 29/0607 |
| JP | 59-94618 U | 6/1984 | |
| JP | 59-190513 A | 10/1984 | |
| JP | 61-92319 A | 5/1986 | |
| JP | 5-87135 A | 4/1993 | |
| JP | 2649745 B2 | 9/1997 | |
| TW | 200530517 A | 9/2005 | |

OTHER PUBLICATIONS

Office Action dated Jan. 30, 2018, issued in counterpart Japanese Application No. 2017-536552, with English translation. (8 pages).

Office Action dated Nov. 16, 2017, issued in counterpart Chinese Application No. 201510084770.3, with English translation. (9 pages).

* cited by examiner

MOVEMENT GUIDE DEVICE

TECHNICAL FIELD

The present disclosure relates to a movement guide device, and particularly, to a movement guide device having a roller retaining member.

DESCRIPTION OF THE RELATED ART

A linear guide rail, as one kind of movement guide devices, comprises a rail and a moving block mounted to be moveable along the rail. A plurality of roll balls capable of rolling are provided between the rail and the moving block. The plurality of roll ball are circulated in an annular roll ball circulation path, which includes: a load path formed by a roll ball rolling groove provided in the rail and a load roll ball rolling groove provided in the moving block and arranged opposite to the roll ball rolling groove of the rail, a no-load path provided in the moving block and parallel to the load path, and a U-shaped direction conversion path provided in the moving block and connecting an end of the load path with an end of the no-load path.

In the above-described linear guide rail, a roll ball retaining member is required to retain the roll ball rolling in the load path.

For example, patent document 1 discloses a roll ball retaining member used in a movement guide device for retaining roll balls. In the patent document 1, for example, as shown in FIG. 4, a roll ball retaining member 10, a roll ball retaining member 11 and a roll ball retaining elastic member 13 are used to retain upper and lower rows of roll balls on a side of a moving block at the same time.

In the patent document 1, however, up to three retaining members are needed for simultaneously retaining upper and lower rows of roll balls on a side of the moving block, thus, the number of the members is larger, and assembling operations are complicated.

Patent document 1: JP 2649745B2

SUMMARY

The present disclosure is made in order to overcome the above defects, and has an object to provide a movement guide device having less roller retaining members for retaining rollers and enabling easy assembling operations.

In order to achieve the above object, the present disclosure provides a movement guide device, comprising: a support body formed with two roller rolling grooves in each of two side surfaces thereof a moving body assembled onto the support body to freely move along the support body, and having a load roller rolling groove provided opposite to the roller rolling groove so as to form a load path together with the roller rolling groove; rollers arranged such that lines forming a contact angle with respect to the roller rolling groove intersect at a position outside of the support body; and a roller retaining member arranged between two rows of the rollers, the moving body comprises a main moving body and cover bodies mounted at both ends of the main moving body, the movement guide device being characterized in that, the roller retaining member comprises a roller retaining portion, which is formed in a plate shape extending in a length direction of the support body and is orthogonal to the length direction, and the roller retaining portion retains the two rows of the rollers simultaneously.

Advantageous Effects

In the movement guide device according to the present disclosure, since roller retaining member comprises roller retaining portion for retaining two rows of rollers simultaneously, upper and lower rows of rollers on one side of the moving block can be retained by only one roller retaining member, without other additional members, thereby the number of members is reduced, and assembling operations are easy; further, since the roller retaining portion is formed in a plate shape extending in a length direction of the support body and is orthogonal to the length direction, thus the shape is simple and the retaining member is easy to be manufactured, and accordingly the moving body and the support body need not to be particularly machined.

Figure 1:
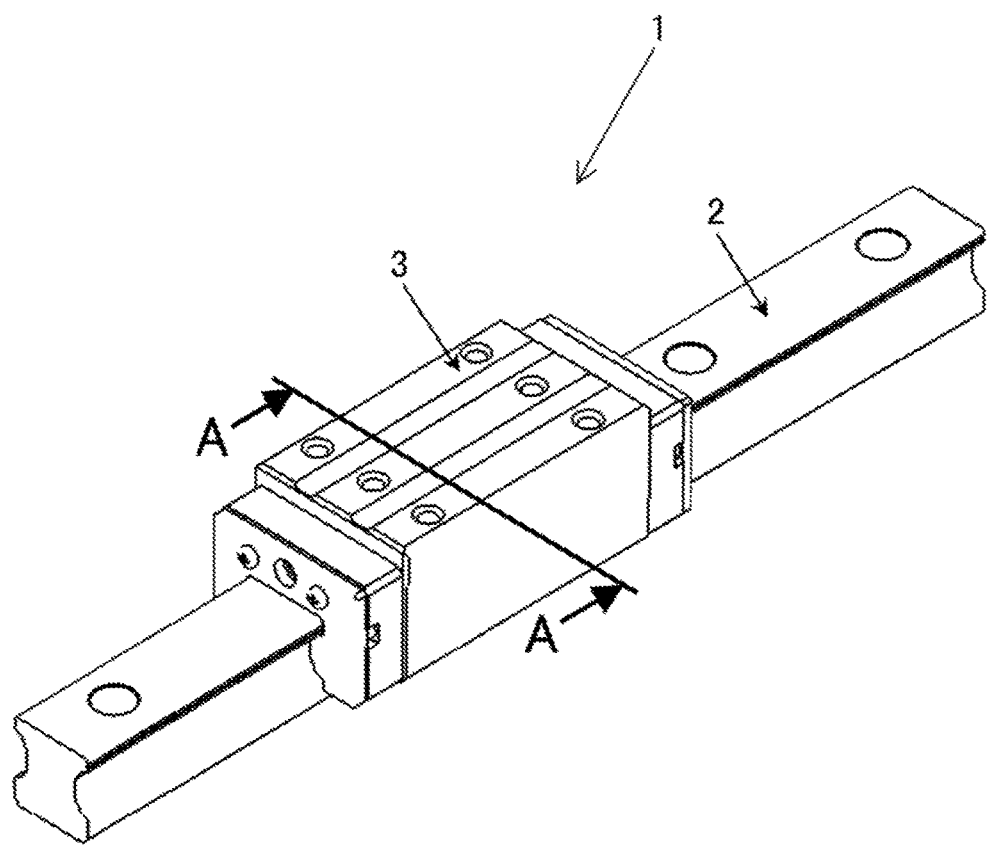
FIG. 1 is a perspective view of a movement guide device according to the present disclosure.

REFERENCE NUMERALS 1 linear guide rail (movement guide device)
2 rail (support body)
2a roll ball rolling groove
2b outer wall surface
3 moving block (moving body)
3a slider (main moving body)
3a1 load roll ball rolling groove
3a2 no-load path
3a3 inner wall portion
3b1 end cover plate (cover body)
3b11 receiving groove
3b12 engagement and stop groove
3b2 inner direction conversion path formation member
3b3 end cover plate sealing member
4 roll ball retaining member
4a roll ball retaining portion
4a1 recess
4b fixing portion
4b1 bent part
4b2 engagement and stop portion
5 screw
6 screw
B roll ball (roller)

DETAILED DESCRIPTION OF PREFERRED EMBODIMENTS

Hereinafter, structures and functions of parts of the present disclosure will be described in detail with refer to the drawings. Further, in the following description, the likes or corresponding members or structures are denoted by the like reference numerals and repeated description thereof will be omitted.

As shown in FIG. 1, a linear guide rail 1, as one kind of movement guide devices, comprises a rail 2 and a moving block 3 mounted to be freely moveable along the rail 2, and the moving block 3 is configured to relatively move linearly in a length direction of the rail 2. Further, the rail 2 is mounted to a fixing side of a base or the like, and the moving block 3 is used to mount thereon a guided object such as a worktable or the like.

Figure 2:
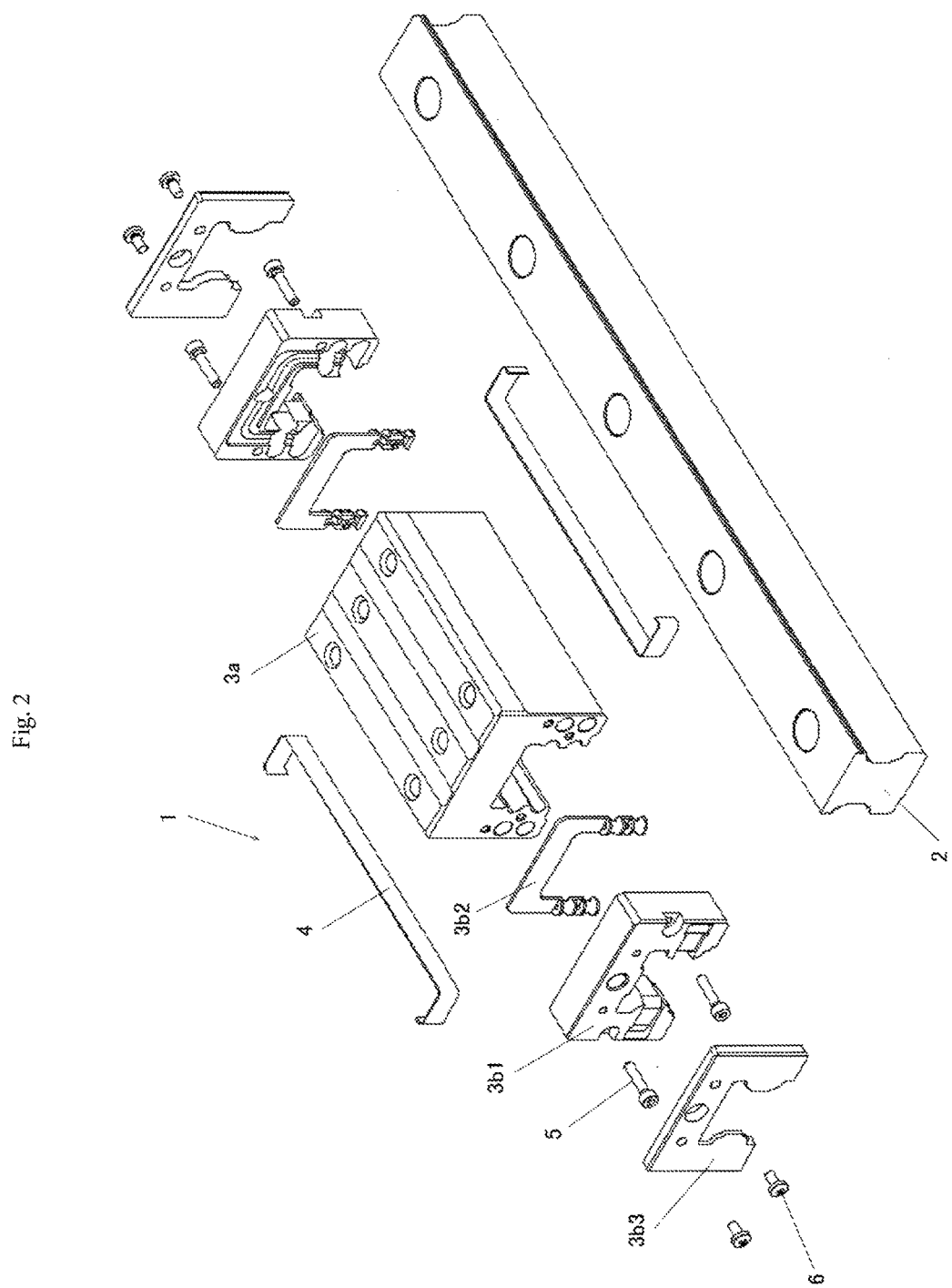
FIG. 2 is an exploded perspective view of a movement guide device according to the present disclosure.

Further, as shown in FIG. 2, the moving block 3 comprises a slider 3a, end cover plates 3b1, inner direction conversion path formation members 3b2 and end cover plate sealing members 3b3. Furthermore, the inner direction conversion path formation member 3b2 is embedded in a surface of the end cover plate 3b1 at the side of the slider 3a so as to form a U-shaped direction conversion path for direction conversion of roll balls B, which will be described later, in the moving block 3. Further, a screw 5 is a member for threadedly fixing the end cover plate 3b1 and the inner direction conversion path formation member 3b2 onto the slider 3a. Moreover, a screw 6 is a member for threadedly fixing the end cover plate sealing member 3b3 onto the end cover plate 3b1, after a roll ball retaining member 4, which will be described later, is mounted onto the end cover plate 3b1.

Figure 3A:
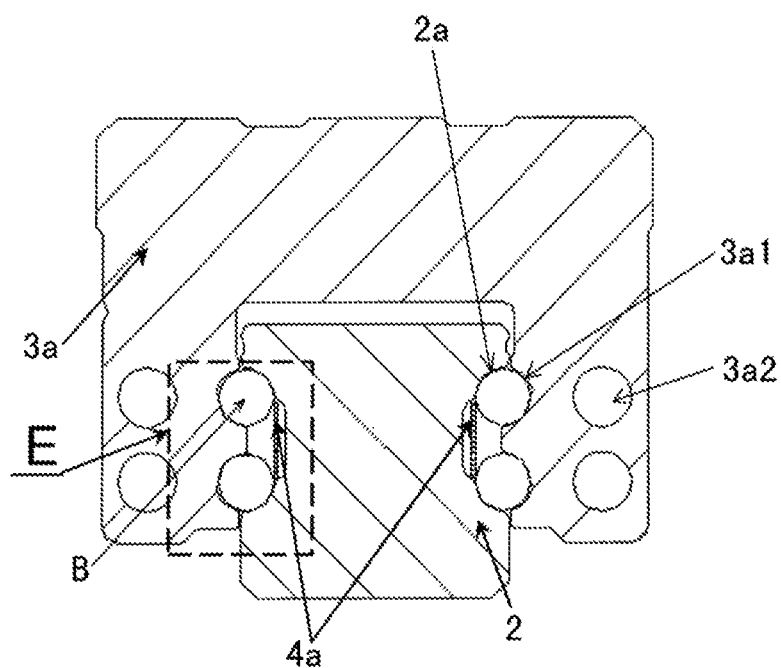
FIG. 3(a) is a cross sectional view of the movement guide device according to the present disclosure, taken along a line A-A shown in FIG. 1.

Further as shown in FIG. 3(a), the rail 2 is formed with two roller rolling grooves 2a in each of two side surfaces thereof, and the slider 3a has a load roller rolling groove 3a1 provided opposite to the roller rolling groove 2a so as to form a load path together with the roller rolling groove, and the slider 3a further has a no-load path 3a2 parallel to the load path. A plurality of roll balls B are provided between the rail 2 and the moving block 3 and capable of rolling therebetween. The plurality of roll balls B are circulated in an annular roll ball circulation path, which includes the above mentioned load path, the above mentioned no-load path 3a2, and the above mentioned U-shaped direction conversion path connecting an end of the load path with an end of no-load path 3a2. Thereby, the moving block 3 can freely move linearly along the rail 2.

Hereinafter, the roll ball retaining member 4 according to embodiments of the present disclosure will be described in detail with reference to FIG. 3 to FIG. 7.

Figure 4:
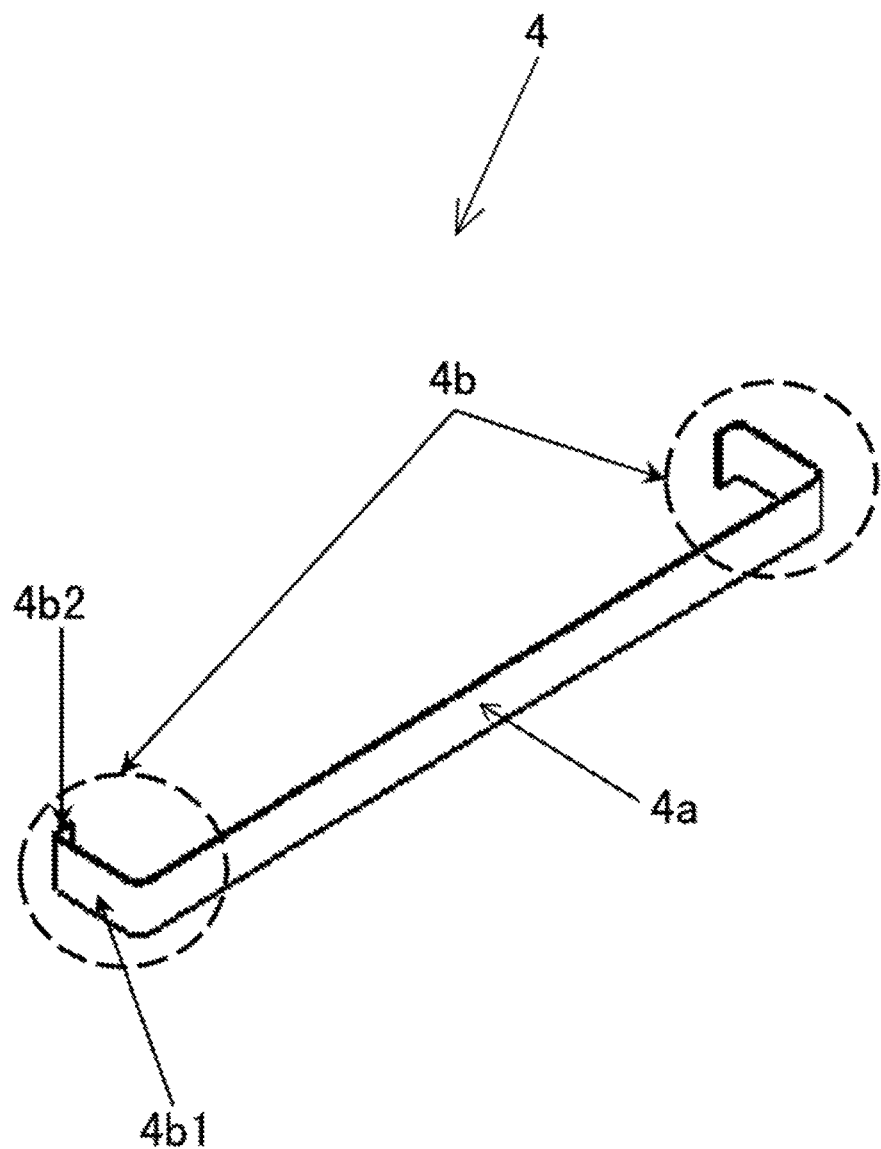
FIG. 4 is a perspective view of a roller retaining member according to an embodiment of the present disclosure.

As shown in FIG. 4, the roll ball retaining member 4 is a member provided between the rail 2 and the moving block 3 for retaining the roll balls B, and comprises a roll ball retaining portion 4a and a fixing portion 4b, and the fixing portion 4b has a bent part 4b1 and a engagement and stop portion 4b2.

Figure 3B:
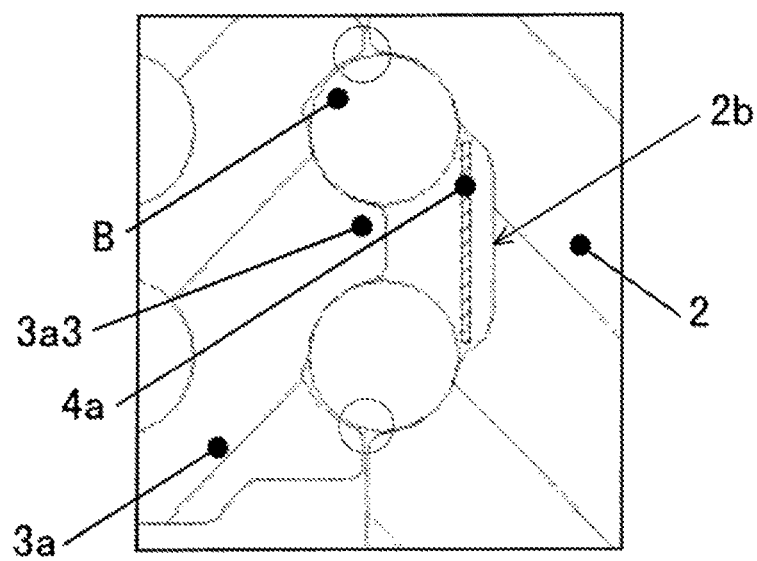
FIG. 3(b) is an enlarged view of a frame portion denoted by "E" shown in FIG. 3(a).

Specifically, as shown in FIG. 3(a) and FIG. 3(b), the roll balls B are arranged such that lines forming a contact angle with respect to the roll ball rolling groove 2a intersect at a position outside of the rail 2, and the roll ball retaining member 4 is disposed between two rows of roll balls arranged as above and comprises a roll ball retaining portion 4a, which is formed in a plate shape extending in the length direction of the rail 2 and is orthogonal to the length direction, the roll ball retaining portion 4a retains the two rows of roll balls B arranged as above simultaneously. Thereby, upper and lower rows of rollers on a side of the moving block 3 can be retained by only one roll ball retaining member 4, without other additional members, thus the number of members is reduced, and assembling operations are simple. Further, since the roll ball retaining portion 4a is formed in a plate shape extending in the length direction of the rail 2 and is orthogonal to the length direction, thus the shape is simple and the retaining member is easy to be manufactured, and accordingly, the moving block 3 and the rail 2 need not to be particularly machined.

Further, as shown in FIG. 3(b), the slider 3a has an inner wall portion 3a3 arranged opposite to the roll ball retaining portion 4a, and there is a gap between the roll ball retaining portion 4a and the inner wall portion 3a3. That is, the roll ball retaining portion 4a is not in contact with the inner wall portion 3a3, thereby, influence of the slider 3a on the roll ball retaining member 4 is decreased, such that the roll ball retaining member 4 is relatively stable. Specifically, since there is a manufacturing tolerance for the inner wall portion 3a3 of the slider 3a, the roll ball retaining member 4 would be deformed if the roll ball retaining member 4 contacts the inner wall portion 3a3 and is affected by the inner wall portion 3a3. As a comparison, the present disclosure solves the above problem by providing a gap between the roll ball retaining portion 4a and the inner wall portion 3a3, and roll balls B will be retained more stably by the roll ball retaining member 4. Moreover, since there is a gap between the roll ball retaining portion 4a and the inner wall portion 3a3, operations of positioning the roll ball retaining member 4 and the slider 3a are not required, thereby facilitating design in tolerances. Further, with the gap provided between the roll ball retaining portion 4a and the inner wall portion 3a3, it will be convenient for maintenance and service.

It is noted that, as indicated by the circular part shown in FIG. 3(b), the slider 3a has a portion formed close to the rail 2, more specifically, at the side of the load roll ball rolling groove 3a1 of the slider 3a, a gripping portion gripping the roll ball B is formed larger. Since the gripping portion gripping the roll ball B is formed larger, it can hold the roll ball B in a certain extent, and thus the roll balls B can be held more reliably and stably, merely by the plate-like roll ball retaining portion 4a.

Figure 5A:
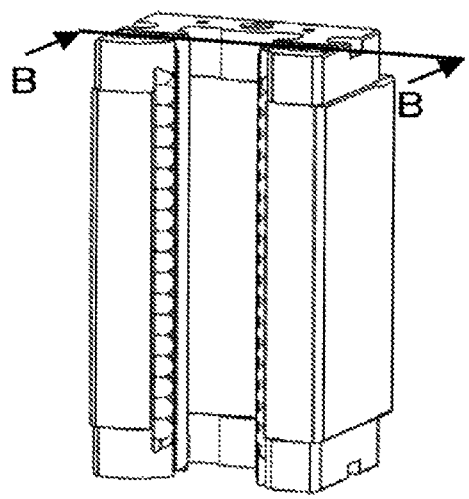
FIG. 5(a) is a perspective view of a moving body according to the present disclosure.
Figure 5B:
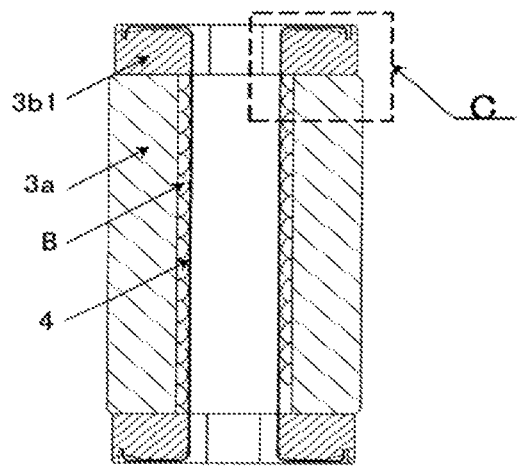
FIG. 5(b) is a cross sectional view of the moving body according to the present disclosure, taken along a line B-B shown in FIG. 5(a)
Figure 5C:
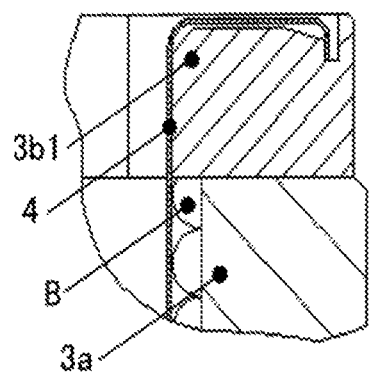
FIG. 5(c) is an enlarged view of a frame portion denoted by "C" shown in FIG. 5(b).
Figure 6A:
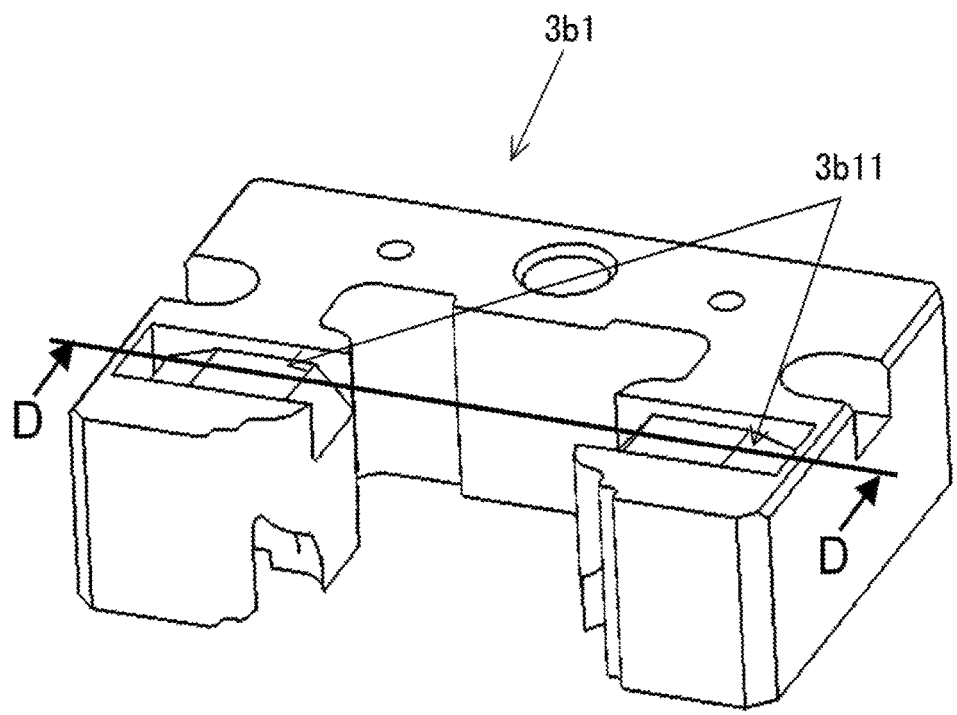
FIG. 6(a) is a perspective view of a cover body according to the present disclosure.
Figure 6B:
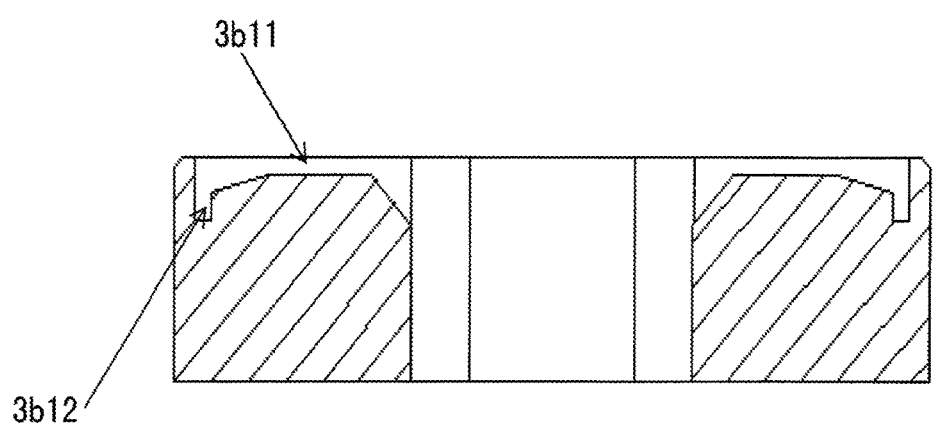
FIG. 6(b) is a cross sectional view of the cover body according to the present disclosure, taken along a line D-D shown in FIG. 6(a).

Further, FIG. 5(a) to FIG. 5(c) shows schematic diagrams of the detached moving block 2 shown in FIG. 2 in an assembled state, where illustrations of the end cover plate sealing members 3b3 and the screws 6 are omitted. As shown in the FIG. 5(a) to FIG. 5(c), the roll ball retaining member 4 for retaining the upper and lower rows of roll balls B on one side of the moving block 3 simultaneously is engaged onto the end cover plate 3b1. Specifically, as shown in FIG. 6(a) and FIG. 6(b), a receiving groove 3b11 for receiving the bent part 4b1 and a engagement and stop groove 3b12 for receiving the engagement and stop portion 4b2 are formed in a surface of end cover plate 3b1 opposite to a surface thereof at the side of the slider 3a, and the roll ball retaining member 4, while retaining the two rows of roll balls B arranged as above by using the roll ball retaining portion 4a is engaged and fixed onto the end cover plate 3b1 by virtue of, for example, its own elasticity, and through receiving the bent part 4b1 in the receiving groove 3b11 and engaging the engagement and stop portion 4b2 into the engagement and stop groove 3b12.

Since the roll ball retaining member 4 has the bent part 4b1 and the engagement and stop portion 4b2 as described above, it can be engaged and fixed onto the end cover plate 3b1 without using mounting members such as a screw and the like, thereby the number of members is reduced, and assembling operations are easy.

Figure 7:
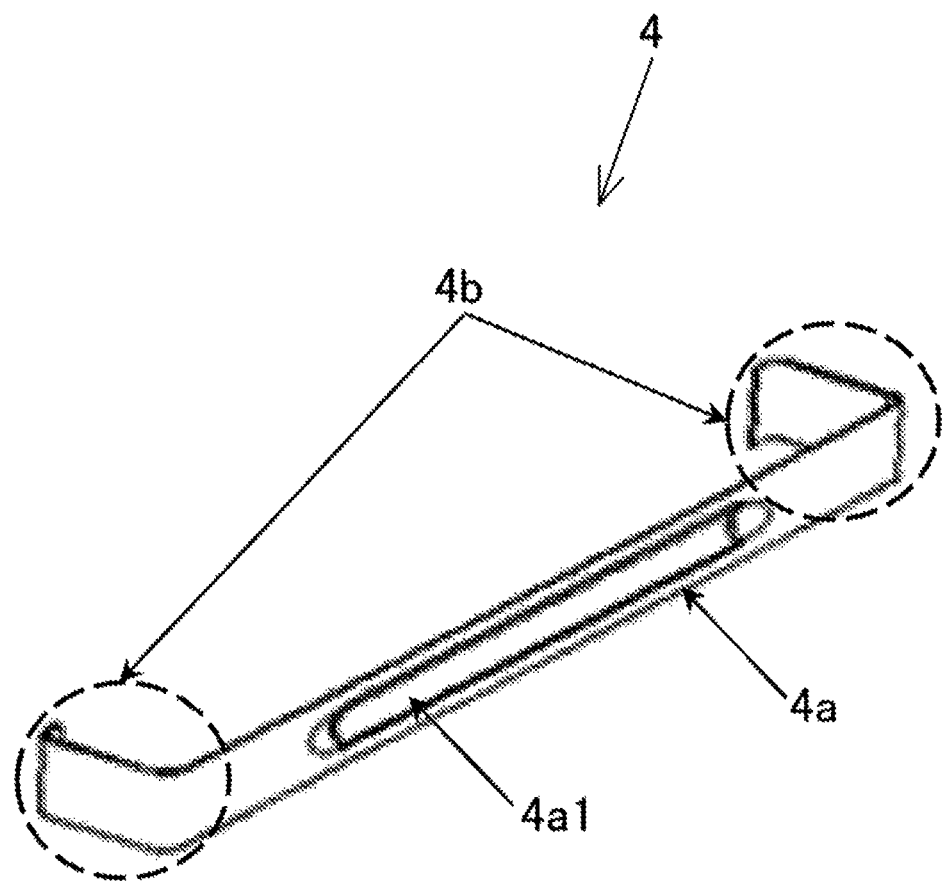
FIG. 7 is a perspective view of a roller retaining member according to another embodiment of the present disclosure.

Further, FIG. 7 is a variant example of the roll ball retaining member 4 of the present disclosure. As shown in FIG. 7, the variant example is different from the roll ball retaining member 4 shown in FIG. 4 in that the roll ball retaining portion 4a is formed with a recess 4a1 in a portion thereof.

With the recess 4a1 being provided in the roll ball retaining portion 4a, retaining strength of the roll ball retaining portion 4a can be improved, thereby the roll balls B can be retained more stably.

A specific structure of the linear guide rail 1 of the present disclosure has been described above by means of exemplary embodiments shown in FIGS. 1-7.

As can be seen from the above description, in order to achieve the object to provide a linear guide rail 1 having less roll ball retaining member 4 for retaining roll balls B and enabling easy assembling operations, the present disclosure provides a linear guide rail 1, characterized in comprising: the rail 2 formed with two roll ball rolling grooves 2a in each of two side surfaces thereof; the moving block 3, assembled onto the rail 2 to freely move along the rail 2, and having a load roll ball rolling groove 3a1 provided opposite to the roll ball rolling groove 2a so as to form a load path together with the roll ball rolling groove; roll balls B, arranged such that lines forming a contact angle with respect to the roll ball rolling groove 2a intersect at a position outside of the rail 2; the roll ball retaining member 4 arranged between two rows of roll balls B, the moving block 3 comprises the slider 3a and end cover plates 3b1 mounted at both ends of the slider 3a; the linear guide rail 1 is characterized in that, the roll ball retaining member 4 comprises a roll ball retaining portion 4a, which is formed in a plate shape extending in the length direction of the rail 2 and is orthogonal to the length direction, and the roll ball retaining portion 4a retains the two rolls of roll balls B simultaneously.

Since the roll ball retaining member 4 comprises the roll ball retaining portion 4a for retaining the two rows of roll balls B simultaneously, upper and lower rows of roll balls B on a side of the moving block 3 can be retained by only one said the roll ball retaining member 4, without other additional members, thereby the number of members is reduced, and assembling operations are easy. Further, since the roll ball retaining portion 4a is formed in a plate shape extending in the length direction of the rail 2 and is orthogonal to the length direction, thus the shape is simple and the retaining member is easy to be manufactured, and accordingly, the moving block 3 and the rail 2 need not to be particularly machined.

Preferably, the slider 3a has an inner wall portion 3a3 arranged opposite to the roll ball retaining portion 4a, and there is gap between the roll ball retaining portion 4a and the inner wall portion 3a3.

Since the roll ball retaining portion 4a is not in contact with the inner wall portion 3a3, thereby, influence of the slider 3a on the roll ball retaining member 4 is decreased, such that the roll ball retaining member 4 is relatively stable. Moreover, operations of positioning the roll ball retaining member 4 and the slider 3a are not required, thereby facilitating design in tolerances. Further, by providing the gap, it will be convenient for maintenance and service.

Preferably, the roll ball retaining member 4 further comprises a fixing portion 4b besides of the roll ball retaining portion 4a, the fixing portion 4b has a bent part 4b1 and a engagement and stop portion 4b2, and the end cover plate 3b1 is formed with a receiving groove 3b11 for receiving the bent part 4b1 and a engagement and stop groove 3b12 for receiving the engagement and stop portion 4b2.

Since the roll ball retaining member 4 has the bent part 4b1 and the engagement and stop portion 4b2 as described above, it can be engaged and fixed onto the end cover plate 3b1 without using mounting members such as a screw and the like, thereby the number of members is reduced, and assembling operations are easy.

Preferably, the roll ball retaining portion 4a is formed with a recess 4a1 in a portion thereof.

Thus, retaining strength of the roll ball retaining portion 4a can be improved, and thereby the roll balls B can be more stably retained.

As described above, preferred embodiments of the present disclosure have been described sufficiently with reference to the drawings, and it would be appreciated by those skilled in the art that various changes or modifications may be made in these embodiments without departing from the scopes of the disclosure defined by technique solutions thereof and shall be covered within the scopes.

What is claimed is:

1. A movement guide device, comprising:
   a support body formed with two roller rolling grooves in each of two side surfaces thereof;
   a moving body assembled to the support body so as to freely move along the support body, and having load roller rolling grooves, each load roller rolling groove being provided opposite to each roller rolling groove so as to form a load path together with each roller rolling groove;
   rollers arranged such that lines forming contact angles with respect to the roller rolling grooves intersect at a position outside of the support body; and
   a roller retaining member arranged between two rows of the rollers,
   wherein the moving body comprises a main moving body and cover bodies mounted at both ends of the main moving body,
   wherein the roller retaining member comprises a roller retaining portion, which is formed in a plate shape extending in a length direction of the support body and is orthogonal to the length direction, and
   wherein the roller retaining portion retains the two rows of the rollers simultaneously; wherein the roller retaining member further comprises a fixing portion in additional to the roller retaining portion,
   the fixing portion comprises a bent part and a engagement and stop portion, and
   the cover body is formed with a receiving groove for receiving the bent part and a engagement and stop groove for receiving the engagement and stop portion.

2. The movement guide device according to claim 1, wherein the main moving body has an inner wall portion arranged opposite to the roller retaining portion, and a gap is provided between the roller retaining portion and the inner wall portion.

3. The movement guide device according to claim 2, wherein the roller retaining portion is formed with a recess in a portion thereof.

* * * * *